US006513054B1

(12) United States Patent
Carroll

(10) Patent No.: US 6,513,054 B1
(45) Date of Patent: Jan. 28, 2003

(54) ASYNCHRONOUS PARALLEL ARITHMETIC PROCESSOR UTILIZING COEFFICIENT POLYNOMIAL ARITHMETIC (CPA)

(75) Inventor: Chester C. Carroll, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/511,636

(22) Filed: Feb. 22, 2000

(51) Int. Cl.[7] .............................. G06F 7/38; G06F 7/52
(52) U.S. Cl. ...................................... 708/490; 708/620
(58) Field of Search ................................ 708/490, 620, 708/625

(56) References Cited

U.S. PATENT DOCUMENTS 5,903,484 A * 5/1999 Tsujihashi .................. 708/620
6,202,077 B1 * 3/2001 Smith ........................ 708/625
6,421,699 B1 * 7/2002 Dhong et al. ............... 708/625

* cited by examiner

Primary Examiner—Tan V. Mai
(74) Attorney, Agent, or Firm—Arthur W. Tischer; Freddie M. Bush; Hay Kyung Chang

(57) ABSTRACT

Sets of coefficient polynomials are used to design embedded-component architectures that have capability for asynchronous parallel execution at an advantageous arithmetic level where algebraic merging is realized with other operations, algorithms or applications. Because of the particular hardware structures made possible by the use of CPA, higher computational granularities and complex modules are more easily feasible than by using conventional arithmetic and, additionally, increased efficiency is obtained for algorithmic computations involving single and multiple operations. This is achieved by the merging of operations and the integration of algorithms, and thereby avoiding the necessity of performing the entire basic arithmetic separately for each operation or algorithm. In the Asynchronous Parallel Arithmetic (APA) Processor Utilizing Coefficient Polynomial Arithmetic (CPA), the various sets of coefficient polynomials represent the merged operations or algorithms at much earlier time slots and their resolution to the final result level is accomplished with notably increased efficiency when compared to conventional structures.

11 Claims, 11 Drawing Sheets

CPA Level One: $P = A \times B = \sum_{i=0}^{i=10} p_i x^i = \sum_{i=0}^{i=10} \sum_{j=0}^{m_i-1} p_{ij} x^{i+j}$ $$AxB = (110111000110) \times (011101101110)$$

(Coefficient Polynomials representing product, AxB)

$$P = \sum_{i=0}^{n-1} p_i 2^i$$

Fig. 5

ASYNCHRONOUS PARALLEL ARITHMETIC PROCESSOR UTILIZING COEFFICIENT POLYNOMIAL ARITHMETIC (CPA)

DEDICATORY CLAUSE

The invention described herein may be manufactured, used and licensed by or for the Government for governmental purposes without the payment of any royalties to me.

BACKGROUND OF THE INVENTION

Execution of complex arithmetic operations and algorithms requires the continuous and repetitious use of conventional addition, subtraction, division and multiplication in ordinary binary form. All of these arithmetic operations involve addition which, as is well known, requires carry propagation that causes inefficiency each time one of these operations is used. Unfortunately, algorithm realizations utilizing conventional arithmetic generally depend on the ability to execute add and multiply operations and to use these two operations to perform the operations of subtract, divide and appropriate combinations. Conventional embedded systems using such repeated addition, subtraction, multiplication and division to achieve execution for algorithms can be extremely wasteful in terms of time and integrated circuit "real estate".

Use of coefficient polynomial arithmetic (CPA) enables higher-level execution structures with efficient, early merging and accumulation, increasing computation volume by using the coefficient polynomials. As parallel arithmetic hardware structures, necessary to perform parallel execution, are considered for embedded computing, it is important to form at a higher level of architecture the components that are useful in executing operations and combinations of operations for application algorithms. Generally, there is potential for increased efficiency with asynchronous-logic realization when parallel or highly-parallel hardware structures are implemented at coarse-granularity levels of mathematical functionality.

The more complicated arithmetic applications demonstrate the highest efficiencies when operations and algorithms are merged creatively at routinely propitious phases of the execution process, without performing the entire basic arithmetic separately for each operation of the algorithm.

SUMMARY OF THE INVENTION

Sets of coefficient polynomials are used to design embedded-component architectures that have capability for asynchronous parallel execution at an advantageous arithmetic level where algebraic merging is realized with other operations, algorithms or applications. Factors to consider in designing such embedded-component architecture are algorithmic-hardware robustness, flexible design needs and positioning for future technology exploitation. This includes efficient-processing realizations for entire algorithms and the integration of algorithm suites. An example of the robustness of an embedded system using coefficient polynomials is illustrated in the design of an asynchronous arithmetic processor to be used as the basic design module for embedded environments.

Because of the particular hardware structures made possible by the use of CPA, higher computational granularities and complex modules are more easily feasible. Further, increased efficiency is obtained for algorithmic computations involving single and multiple operations. This is achieved by the merging of operations and the integration of algorithms, and thereby avoiding the necessity of performing the entire basic arithmetic separately for each operation or algorithm. In the Asynchronous Parallel Arithmetic (APA) Processor Utilizing Coefficient Polynomial Arithmetic (CPA)—henceforth referred to as the "APA Processor"—the sets of coefficient polynomials represent the merged operations or algorithms at much earlier time slots and their resolution to the final result level is accomplished with notably increased efficiency when compared to conventional structures.

DESCRIPTION OF THE DRAWING

FIG. 5 gives a numerical example of the multiplication of two 12-bit numbers, with the counter cells and the coefficients shown for the coefficient polynomials.

DESCRIPTION OF THE PREFERRED EMBODIMENT

Figure 1:
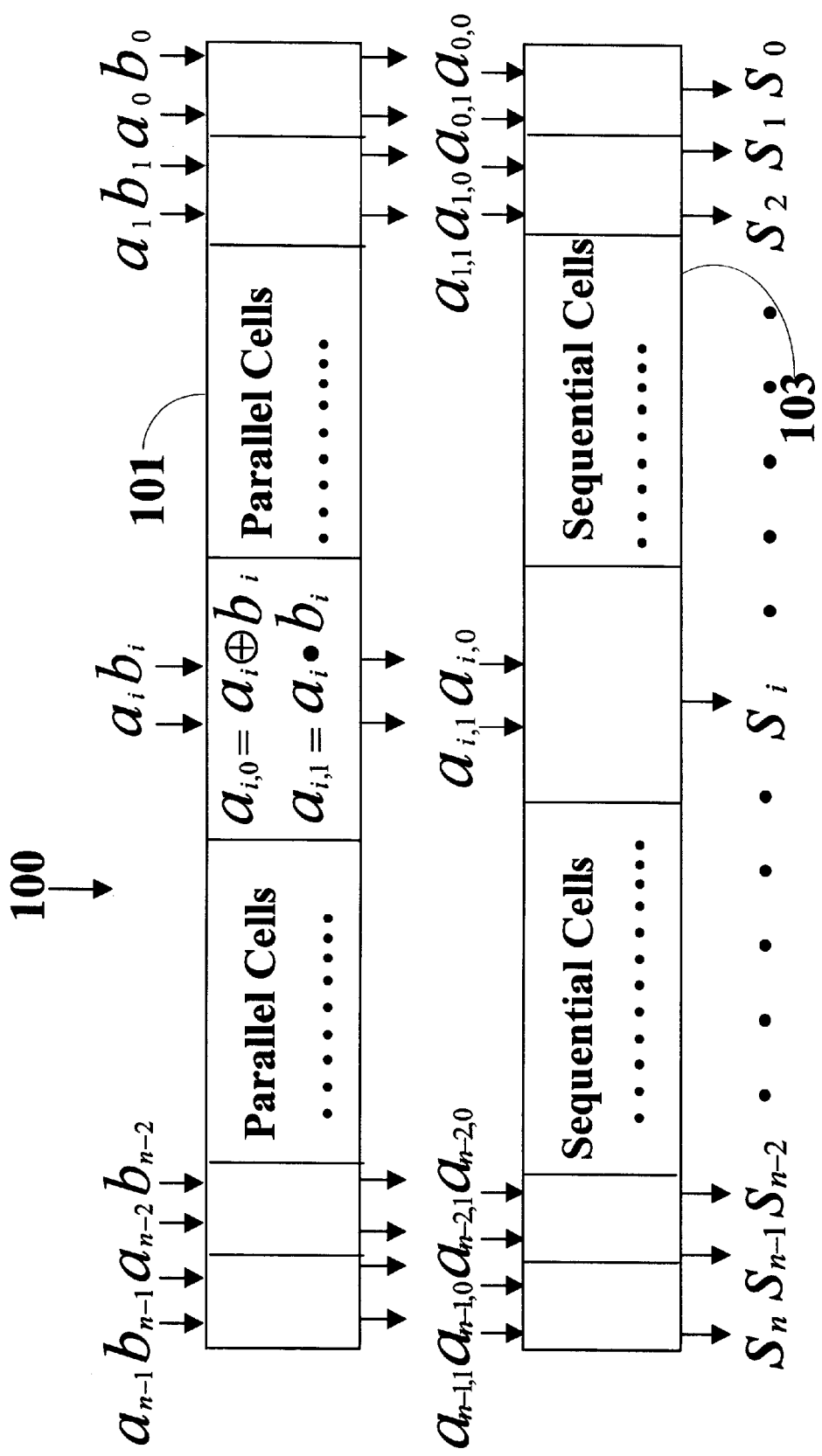
FIG. 1 illustrates the function of two-stage adder.

Referring now to the drawing wherein like numbers represent like parts in each of the several figures and arrow heads indicate the direction of information flow, the APA Processor and its components are presented in detail.

It is based on the conceit—Coefficient Polynomial Arithmetic (CPA)—that sets of coefficient polynomials can be defined and used to represent numbers and arithmetic structures for efficient parallel execution. The following explains the principle of number representation using polynomials as coefficients.

Number Representation Using Polyminals as Coefficients

The standard polynomial representation of numbers allows the expression of a number A as a definite polynomial of radix X and degree n—1 shown below in closed form, $$A = \sum_{i=0}^{n-1} a_i x^i \qquad (1)$$

or in expanded form, $$A = a_{n-1}x^{n-1} + a_{n-2}X^{n-2} + \ldots + a_i x^i + \ldots + a_1 x^1 + a_0 x^0; \qquad (2)$$

where $a_i$ is a single symbol serving as the coefficient of the $i^{th}$ power of the radix X, and n is the number of terms in the expanded form of the number. For the binary number system, the radix is equal to two, and $a_i$ is a single bit, either "0" or "1". Now consider the replacement of each single-bit coefficient $a_i$ by a binary polynomial $p_i$, where the degree of the polynomial can, if appropriate, vary according to its arithmetic environment. This introduces the coefficient polynomial form of numerical representation of number A as $$A = \sum_{i=0}^{n-1} p_i x^i, \qquad (3)$$

$$p_i = f_i\{O(m_i-1), x\}, \qquad (4)$$

with $m_i \geq \text{Log}_2\{\text{number of 1-bits to sum for coefficient}\}$, an integer, (5)

to yield, $$p_i = \sum_{j=0}^{m_i-1} a_{ij} x^j. \qquad (6)$$

The set of coefficient polynomials is used here $\{p_{n-1}\ p_{n-2} \ldots p_1\ p_0\}$ as the set of coefficients which completely specifies a number in polynomial form. The algebraic degrees of the individual coefficient polynomials, $p_i$ are determined by the historical state of the application algorithm being executed. When a number in conventional binary form enters the execution process, each coefficient polynomial of the set representing the number has a degree of "0", which means that each coefficient polynomial of the set has a single term. For the sum or difference of two such numbers, each coefficient polynomial of the set representing the result has degree "1", which means that each coefficient polynomial of the set has two terms. In the case of a multiplication result, the degrees of the coefficient polynomials in the set vary from "0" to $\text{Log}_2[n]$, where n−1 is the degree of the multiplier polynomial. For division, the set of coefficient polynomials representing the quotient has the same algebraic degree structure as multiplication results, with the degree of each coefficient polynomial being determined by the degree of the dividend in polynomial form; i. e., $\text{Log}_2[n]$. For the summation process, in its expanded coefficient polynomial form, binary $p_i$ becomes, $$p_i = a_{i,m_i-1} x^{m_i-1} + a_{i,m_i-2} x^{m_i-2} + \ldots + a_{i,j} x^j + \ldots + a_{i,1} x^1 + a_{i,0} x^0. \qquad (7)$$

Consequently, the expanded coefficient polynomial form of the number A becomes, $$A = \left(a_{n-1,m_{n-1}-1} x^{m_{n-1}-1} + a_{n-1,m_{n-1}-2} x^{m_{n-1}-2} + \ldots + a_{n-1,j} x^j + \ldots + a_{n-1,1} x^1 + a_{n-1,0} x^0\right) x^{n-1} + \qquad (8)$$

$$\left(a_{n-2,m_{n-2}-1} x^{m_{n-2}-1} + a_{n-2,m_{n-2}-2} x^{m_{n-2}-2} + \ldots + a_{n-2,j} x^j + \ldots + a_{n-2,1} x^1 + a_{n-2,0} x^0\right) x^{n-2} +$$

$$(\ldots) + (\ldots) + \left(a_{1,m_1-1} x^{m_1-1} + a_{1,m_1-2} x^{m_1-2} + \ldots + a_{1,j} x^j + \ldots + a_{1,1} x^1 + a_{1,0} x^0\right) x^1 +$$

$$\left(a_{0,m_0-1} x^{m_0-1} + a_{0,m_0-2} x^{m_0-2} + \ldots + a_{0,j} x^j + \ldots + a_{0,1} x^1 + a_{0,0} x^0\right) x^0.$$

Each $a_i$ is a single binary digit, and the radix X is equal to two. The matrix form of the above equation allows a shorthand view of the set of equations defining the number A in terms of the set of polynomial coefficients $a_{i,j}$. This is used to develop hardware architecture with highly parallel structure in which for numbers of equal length, every $p_i$ is of degree equal to the maximum required degree of any $p_i$.

In the case of coefficient polynomials representing the Cauchy product, not all polynomials are of the same degree, as is shown in the example of multiplication below, $$\begin{bmatrix} a_{n-1,m_{n-1}-1} & a_{n-1,m_{n-1}-2} & \cdots & a_{n-1,1} & a_{n-1,0} \\ a_{n-2,m_{n-2}-1} & \cdots & \cdots & \cdots & \cdots \\ \cdots & \cdots & \cdots & \cdots & \cdots \\ a_{1,m_1-1} & \cdots & \cdots & a_{1,1} & a_{1,0} \\ a_{0,m_0-1} & \cdots & \cdots & a_{0,1} & a_{0,0} \end{bmatrix} \times \qquad (9)$$

-continued $$\begin{bmatrix} x^{m_{n-1}-1} & x^{m_{n-2}-1} & \cdots & x^{m_1-1} & x^{m_0-1} \\ x^{m_{n-1}-2} & x^{m_{n-2}-2} & \cdots & x^{m_1-2} & x^{m_0-2} \\ \cdots & \cdots & \cdots & \cdots & \cdots \\ x^1 & \cdots & \cdots & x^1 & x^1 \\ x^0 & \cdots & \cdots & x^0 & x^0 \end{bmatrix} \times \begin{bmatrix} x^{n-1} & 0 & \cdots & \cdots & 0 \\ 0 & x^{n-2} & 0 & \cdots & \cdots \\ \cdots & 0 & \cdots & 0 & \cdots \\ \cdots & \cdots & 0 & x^1 & 0 \\ 0 & \cdots & \cdots & 0 & x^0 \end{bmatrix} = A$$

or expressed as a double series, $$A = \left(a_{n-1,m_{n-1}^{-1}} x^{m_{n-1}^{-1}} + a_{n-1,m_{n-1}^{-2}} x^{m_{n-1}^{-2}} + \ldots + a_{n-1,j} x^j + \ldots + a_{n-1,1} x^1 + a_{n-1,0} x^0\right) x^{n-1} + \tag{10}$$
$$\left(a_{n-2,m_{n-2}^{-1}} x^{m_{n-2}^{-1}} + a_{n-2,m_{n-2}^{-2}} x^{m_{n-2}^{-2}} + \ldots + a_{n-2,j} x^j + \ldots + a_{n-2,1} x^1 + a_{n-2,0} x^0\right) x^{n-2} +$$
$$(\ldots) + (\ldots) + \left(a_{1,m_1^{-1}} x^{m_1^{-1}} + a_{1,m_1^{-2}} x^{m_1^{-2}} + \ldots + a_{1,j} x^j + \ldots + a_{1,1} x^1 + a_{1,0} x^0\right) x^1 +$$
$$\left(a_{0,m_0^{-1}} x^{m_0^{-1}} + a_{0,m_0^{-2}} x^{m_0^{-2}} + \ldots + a_{0,j} x^j + \ldots + a_{0,1} x^1 + a_{0,0} x^0\right) x^0.$$

The following is a useful compact form representation that consists of only the set of coefficients of the coefficient polynomials:

$$\left(a_{n-1,m_{n-1}^{-1}} \; a_{n-1,m_{n-1}^{-2}} \; \ldots \; a_{n-1,j} \; \ldots \; a_{n-1,1} a_{n-1,0}\right) \tag{11}$$
$$\left(a_{n-2,m_{n-2}^{-1}} \; a_{n-2,m_{n-2}^{-2}} \; \ldots \; a_{n-2,j} \; \ldots \; a_{n-2,1} a_{n-2,0}\right)$$
$$(\ldots)$$
$$(\ldots)$$
$$\left(a_{1,m_1^{-1}} \; a_{1,m_1^{-2}} \; \ldots \; a_{1,j} \; \ldots \; a_{1,1} a_{1,0}\right)$$
$$\left(a_{0,m_0^{-1}} \; a_{0,m_0^{-2}} \; \ldots \; a_{0,j} \; \ldots \; a_{0,1} a_{0,0}\right).$$

Alternatively, it can be represented as a symbolic version of the set of coefficient polynomials, $$\{p_{n-1} p_{n-2} \cdots p_1 p_0\}. \tag{12}$$

The coefficient polynomial representation, as explained above, may be used to demonstrate its compliance with the fundamental laws and postulates of algebra; i.e. commutative, associative and distributive laws; and that the representation has the reflexive, symmetric and transitive properties. This representation is a double finite series and obeys the fundamental laws and postulates of mathematical series.

Further mathematical explications that follow teach the use of coefficient polynomial arithmetic (CPA) to achieve highly-parallel structures and demonstrate its utility for embedded, or domain-specific, systems. Because the mathematical execution takes place at lower arithmetic or algorithmic levels, the parallel arithmetic structures exhibit improved execution efficiencies, require fewer logic elements and smaller area-to-speed ratios. Also, the integrated circuit "real estate" is considerably less as a result of only modest increases in logic width and considerable reduction in logic depth. The time required for arithmetic execution in coefficient polynomial form and subsequent conversion to ordinary binary representation is less than the time required for conventional arithmetic processing. The principles of CPA can be used to build efficient parallel matrix multipliers, single-pass arithmetic processors, image processors, cross-correlators, trackers, cellular automata, differential equation solvers, fast Fourier Transforms, fast inverse Fourier Transforms and composite guidance architecture.

For applications in general, the use of CPA allows realization of an entire algorithm suite by using appropriately combined or integrated algebraic-arithmetic methods executed within scalable arithmetic structures and architecture. The use of CPA can minimize the required arithmetic logic depth and increase the logic width. In most applications, the use of CPA permits the early integration of some emerging results to form yet another result. Of key importance is the fact that evaluations and decisions may be made at the CPA level rather than having to compute closed-form binary values.

It is well-known that the Cauchy product of two polynomial series may be taken in whole or in parts, using all of the ordered segments of each polynomial. Basic arithmetic teaches performance of multiplication by taking each of the single coefficients of the multiplier times all single coefficients of the multiplicand and then ordering the summation of all terms of equal powers of the radix into the Cauchy product, arranged in an orderly set of column listings. It is this listing of the Cauchy product that has been, along with column compression methods, the basis of fast multiplication that made achievement of added efficiency possible in determining the coefficient bits of the product polynomial.

It is advantageous to delay resolution of the product polynomial into this single-bit-coefficient polynomial result until it is needed for other purposes. Instead, the executions at the algorithm and the operation-combining levels are carried out with efficiency that increases in proportion to the algorithm or operation-combining complexity. These early execution-levels using CPA allow the use of parallel hardware execution paths for multiplication with compression of the execution depth. Addition and, in particular, accumulation may also be carried out in parallel paths created with a single stage that is half-addition or, in the case of accumulation, column compression done totally within parallel hardware cells or paths as shown in FIG. 1. As further explained elsewhere below, this produces a wider form of the result when compared to the ordinary binary result, but its early availability and the intermediate avoidance of any carries make it a very useful form of the result for embedded applications. Arithmetic here focuses on multiplication and addition using CPA, with the realization that division and subtraction for embedded applications may be performed using much the same execution principles or procedures.

The need for efficient multiplication in compute-intensive applications was recognized by A. D. Booth in "A Signed Binary Multiplication Technique," *Quarterly J. Mechanical and Applied Math.*, vol. 4, part 2 (1951). Computing the product or the partial products efficiently by compressing the column sums and using generalized parallel counters ($n_{k-1}, n_{k-2}, \ldots, n_{k-1, nk-1}$, m) from this arrangement, remains under consideration. H. Al-Twaijry and M. Flynn recently gave an excellent summary of other work by contrasting and briefly relating significant contributions in this field in their article, "Technology Scaling Effects on Multipliers," *IEEE Trans. Computers*, vol. 47, no. 11, pp. 1,201–1,215 (Nov. 1998).

For multipliers, efficient merging of the columns into a set of parallel counters with m=2 in the final stage continues to be of interest. As stated in the Al-Twaijry and Flynn article, the tree structures described, respectively, by C. Wallace in "A Suggestion for a Fast Multiplier," *IEEE Trans. Electronic Computers*, vol 13, pp. 14–17 (Febrery 1964), L. Dadda in "Some Schemes for Parallel Multipliers," *Alta Frequenza*, vol. 34, pp. 349–356 (March 1965) and in "Composite Parallel Counters," *IEEE Trans. Computers*, vol. 29, no. 10, pp. 942–946 (October 1980) and W. Stenzel, W. Kubitz and G. Garcia in "A Compact High-Speed Multiplication Scheme," *IEEE Trans. Computers*, vol. 26, no. 10, pp. 948–957 (October 1977) "suffer from irregular interconnections."

Figure 2:
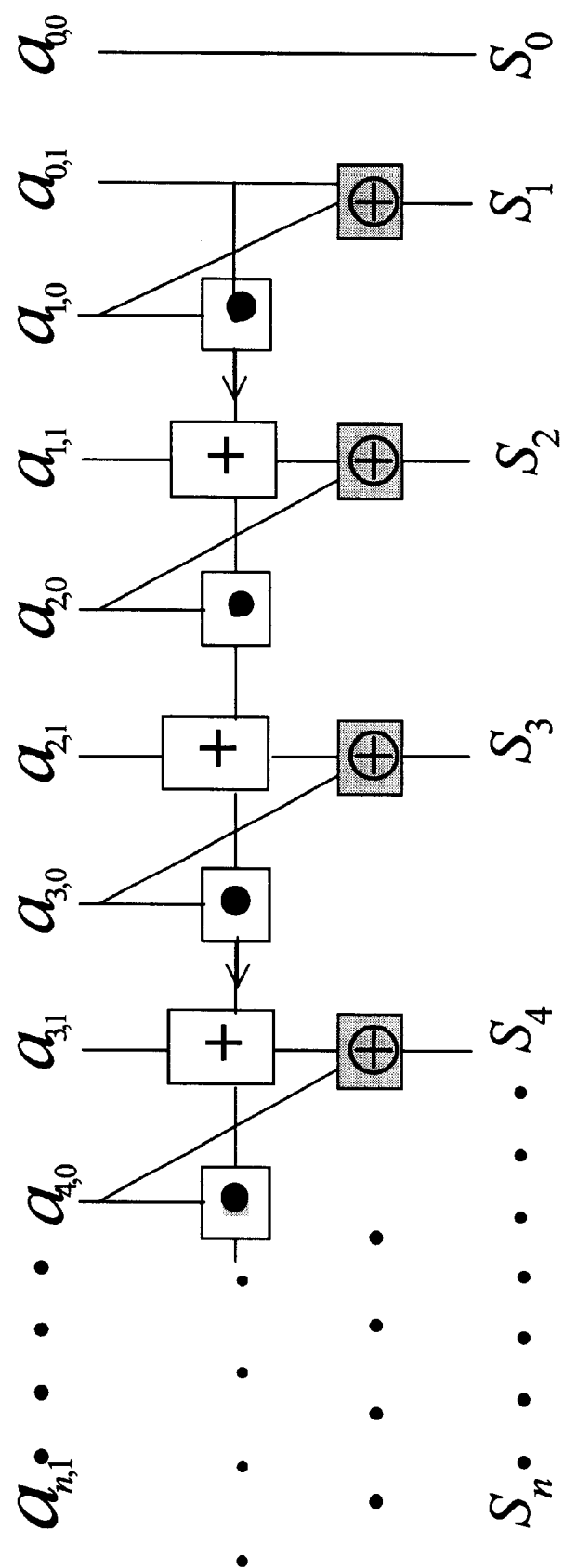
FIG. 2 depicts the structure of the series of sequential cells.
Figure 3:
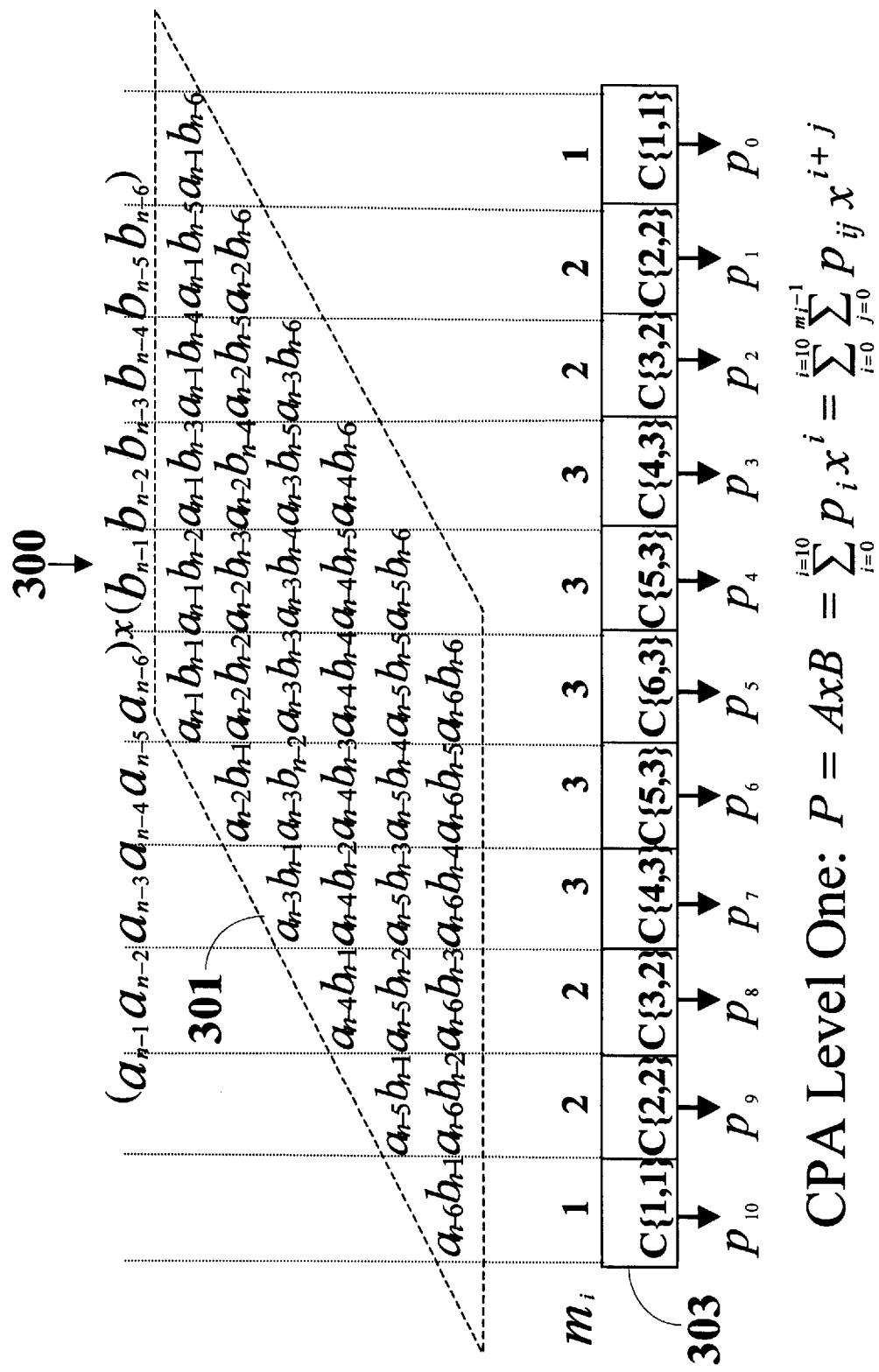
FIG. 3 shows multiplier 300 that utilizes Cauchy product registers.
Figure 4:
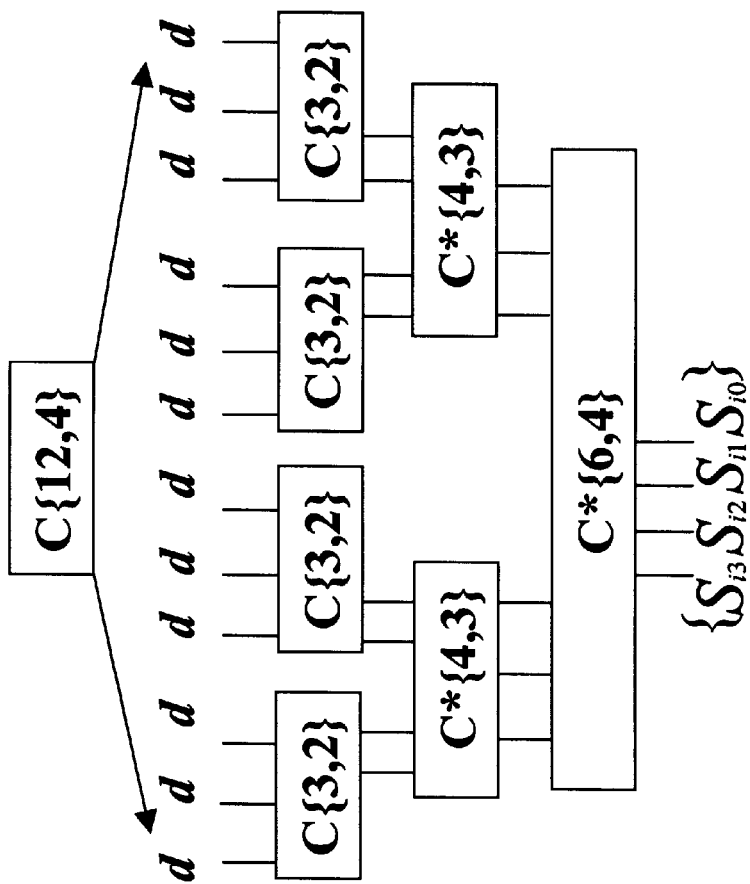
FIG. 4 shows how an exemplary column of 12 bits can be counted.

The most efficient multiplier for embedded applications may be developed when each column is summed individually and when all are summed in parallel hardware paths within stages that withhold the crossovers from present stages until the input to subsequent CPA stages. In FIGS. 2, 3 and 4, the crossovers are clearly shown by the individual coefficient polynomials which specify the fan-out from each column to the more significant bit columns involved at the next stage. At any given stage, the set of coefficient polynomials represent the product completely and may be used to perform combined operations or algorithm integration. The resulting binary coefficient polynomials represent the product at an early stage with the polynomials being weighted relative to the binary position of the column they represent. These polynomials make a complete set of partial products representing the final product and are the basis for CPA. Additional counter stages may be added to complete, or convert, the product to binary form. The crossover bits are contained in the set of polynomial coefficients and it is not essential that they be resolved until the final result in ordinary form is needed for the embedded application. For some embedded applications, this early form of the product is useful because it is an integral part of an algorithm or operation and may, therefore, be combined or merged with other intermediate results, thus creating increased efficiency.

Figure 8:
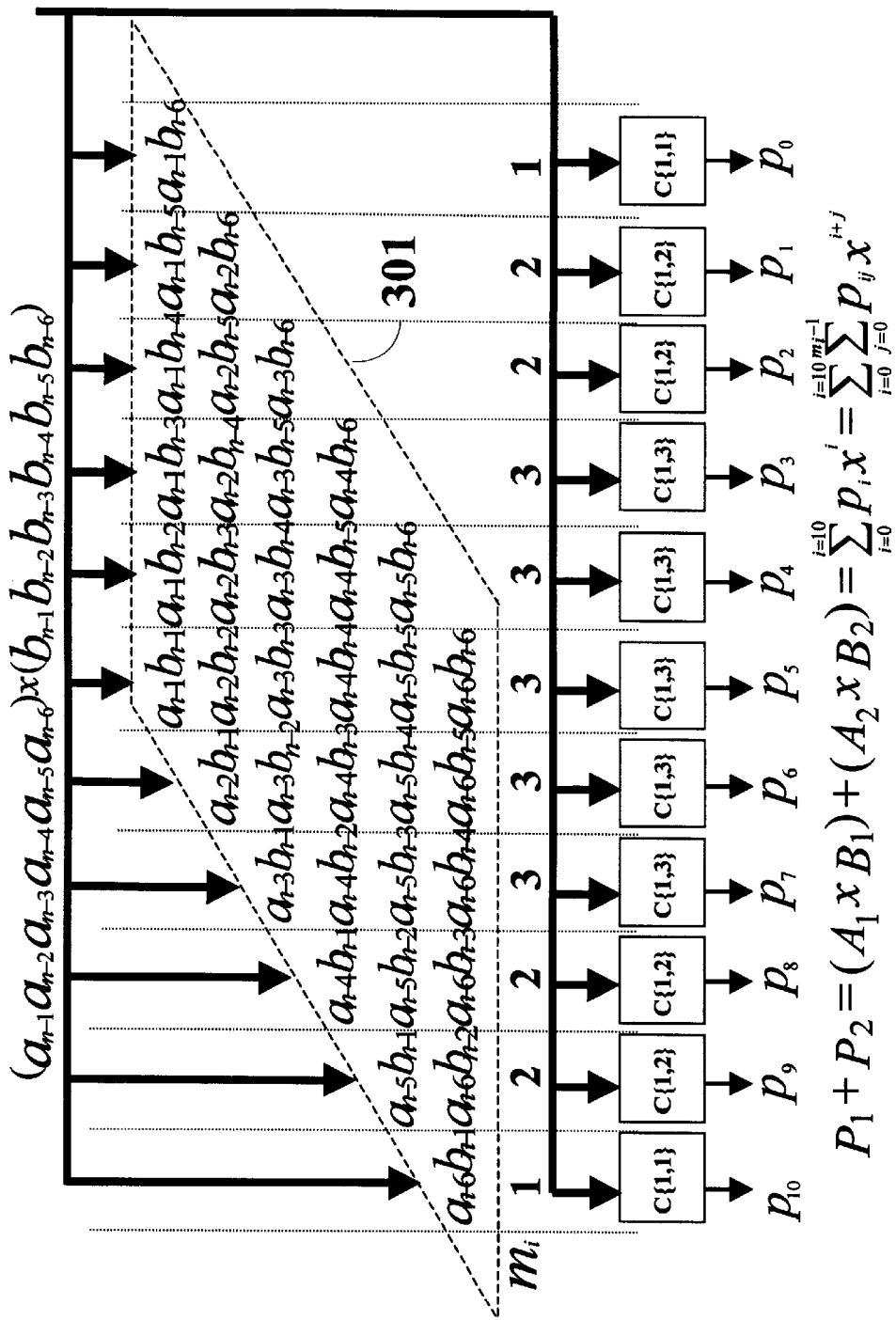
FIG. 8 illustrates how imaging data can be corrected or registered according to specific algorithms that involve pixel by pixel correction or registration.
Figure 9:
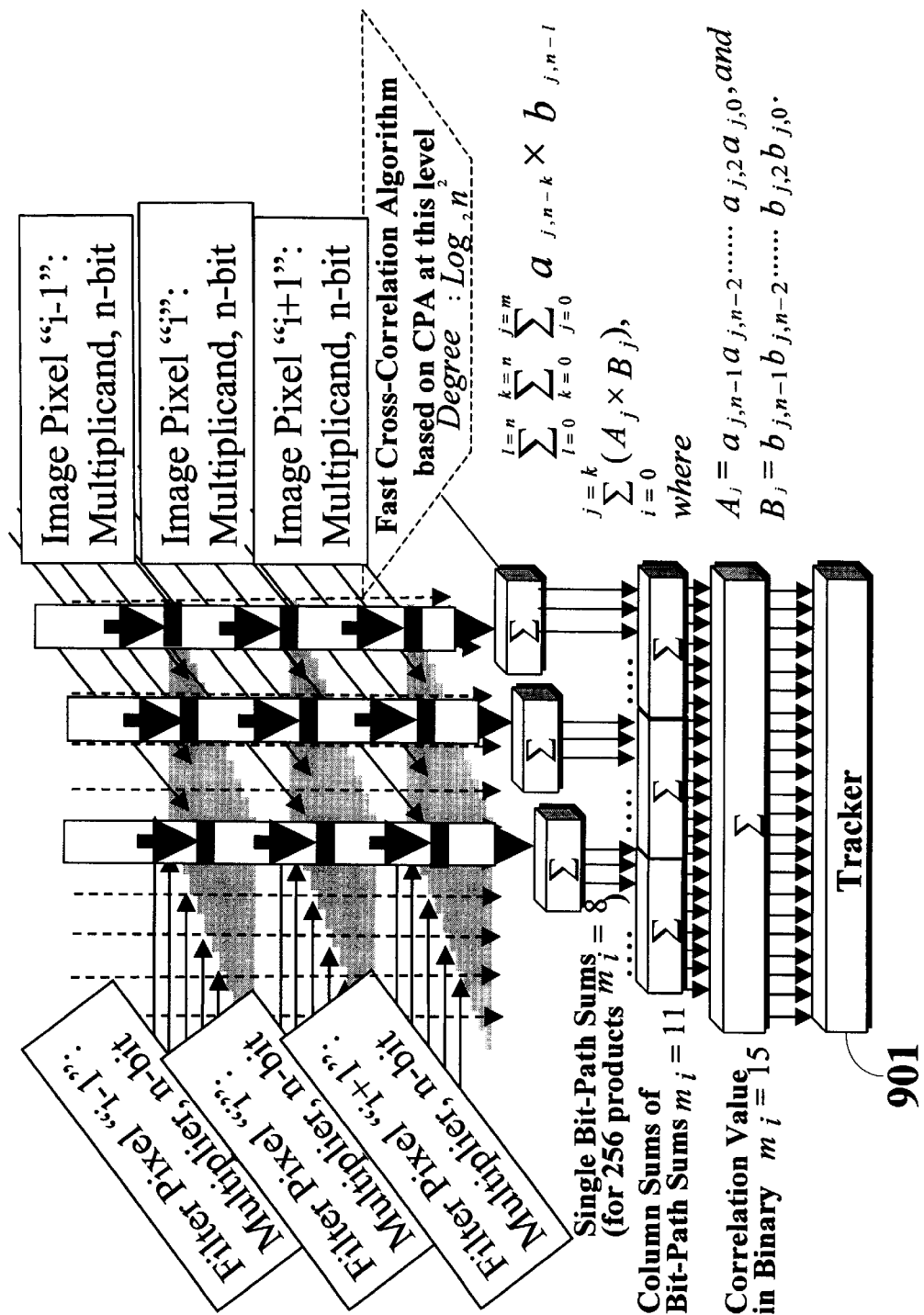
FIG. 9 illustrates image cross-correlation process using CPA.

As illustrated in FIGS. 2, 3, and 4, the interconnections between column sums are clearly shown by the overlap of the relative weights of the coefficient polynomials as the subsequent counter stages are formed. The value of m (Eq. (5)) for each counter in each stage is determined as $\text{Log}_2\{1+\text{crossovers to the counter}\}$. From the very first summation of the columns into a set of coefficient polynomials, the result formed is a valid and useful result that may be combined and used with other results to complete operation-combining or algorithm integration using CPA. The multiply-accumulate operation may be fused, as illustrated in FIGS. 8 and 9, to accelerate algorithm-embedded processes such as computation of the cross-correlation value for two images, i.e. multiple pixels can be processed by using bit-parallel paths and combining multiply and accumulate operations.

An area of interest in multipliers is the efficient shift-and-add of the counter outputs at the {3,2} and {2,2}, counter levels shown in FIG. 3, to provide the final product in binary form. In the APA Processor (depicted in FIG. 7), the multipliers are designed to allow either inclusion or exclusion of the final addition. Detailed descriptions of the various components of the APA Processor are given below.

The Adder:

As shown in FIG. 1, the addition process may be separated into two stages, the first stage being comprised of totally-parallel cells and the second stage being comprised of sequential cells realizing the essential recursive functionality of the second stage. Results from the first stage are useful in certain domain-specific applications where the values are being combined or merged with other results. In such cases, the capability to parallel-add using CPA avoids the carry-cost of the second stage.

Addition, as used in the APA Processor, plays a key role in achieving other arithmetic operations such as multiplication and division. In performing addition using CPA, the coefficients, represented by the set of coefficient polynomials as described above, will not always be of order "0", and thus cannot always be represented by a single binary digit. However, CPA allows the minimization of the use of full adders as the means of achieving other arithmetic operations. This minimization is accomplished by the use of two-stage adder 100, illustrated in FIGS. 1 and 2, which separates the addition process into two single stages: namely, initial parallel addition and subsequent sequential addition that exhibits fast recursive execution to yield the sum in ordinary binary form, if desired. The initial parallel addition of input binary bits represented by $a_i$ and $b_i$ is performed in totally parallel CPA form using a plurality of parallel cells 101, producing carry bits represented by $a_{i,1}$ and sum bits represented by $b_{i,0}$. If the final binary result is needed, then the sum and carry bits are input to a plurality of sequential cells 103 where the second stage of the addition is performed in totally sequential form using a plurality of sequential cells 103, producing the final result $S_i$ in ordinary binary form. It is noted that the number of parallel cells making up the first single stage is equal to the number of bits in the numbers that are being added therein whereas the number of sequential cells making up the second single stage is greater than the number of parallel cells by 1. The parallel and sequential cells are coupled to each other via conventional wire connection in one-to-one correspondence except for the very last sequential cell. The determination of the recursive functionality representing the second stage of addition process, and the cellular hardware structure used for realization, is aided by the logical reality of the first-stage outputs that never have the logic value "1" simultaneously. In other words, a•b and a ⊕b are not equal to "1" at the same time. FIG. 2 shows the actual logic gate structure of the series of sequential cells. The series is comprised of a plurality of identical sequential cells, each cell accepting a sum bit and a carry bit from corresponding parallel cell and processing them through an XOR gate, an AND gate and an OR gate to yield the final sum in ordinary binary form, the sequential summation process proceeding from right to left as illustrated in FIG. 2.

In cases where the final binary result is not needed, it is advantageous to use the addition result in CPA form and thus avoid the delay cost of the second stage which is approximately equal to (the word-length)×(twice single gate switching time). Obviously, the word length is greater at the output of the first stage, but going from this output to the final-stage output is costly from the efficiency point of view, and this first-stage result has the same information content as the second-stage result. If, $$A = \sum_{i=0}^{n-1} a_i x^i = \sum_{i=0}^{n-1} \left( \sum_{j=0}^{m_i-1} a_{ij} x^j \right) x^i, \quad (13)$$

and, $$B = \sum_{i=0}^{n-1} b_i x^i = \sum_{i=0}^{n-1} \left( \sum_{j=0}^{m_i-1} a_{ij} x^j \right) x^i, \quad (14)$$

then, for the sum of A and B, $$A + B = \sum_{i=0}^{n-1} \left( \sum_{j=0}^{m_i-1} a_{ij} x^j \right) x^i + \sum_{i=0}^{n-1} \left( \sum_{k=0}^{m_i-1} b_{ik} x^k \right) x^i, \quad (15)$$

and, for j=k;

$$A + B = \sum_{i=0}^{n-1} \sum_{j=0}^{m_i-1} (a_{ij} + b_{ij}) x^{i+j}. \quad (16)$$

Extrapolating the above for accumulation:

$$A + B + C + D \ldots = \sum_{i=0}^{n-1} \sum_{j=0}^{m_i-1} (a_{ij} + b_{ij} + c_{ij} + d_{ij} + \ldots) x^{i+j}. \quad (17)$$

The integrity of each binary digit position is maintained according to the $i^{th}$ coefficient polynomial $p_i$, for all i. It is recognizably true that the column-compression process applied in multipliers can be used here for accumulation with each of the paths executed within parallel hardware paths and then merged and summed using CPA arithmetic. The summation or accumulation is accomplished without any carry operation from bit-position to bit-position until the sequential adding stage. The crossovers representing the accumulation of the carries to each bit position from the output of each CPA level can be counted in the subsequent level. The integer $m_i$-1 represents the degree of the coefficient polynomial $p_i$ for each bit position i. The integer $m_i$ increases with the number of bits required to achieve the coefficient polynomial for each single-bit position of the summation or accumulation. For each sum of two entry bits, $m_i$=2, and in the case of the accumulation of entry bits, representing each of the n single-bit positions of each of the polynomials to be accumulated, the integer, $m_i \geq \mathrm{Log}_2 n$.

To restate the above: the CPA result may be obtained through the half-addition operation to form the CPA level and then the summation completed by the layer of exclusive-or gates to obtain the final result in ordinary binary form.

So, if, $$S = A + B = \sum_{i=0}^{n-1} \sum_{j=0}^{m_i-1} (a_{ij} + b_{ij}) x^{i+j}, \quad (18)$$

the hardware realization would then involve the logic constructs, $$a_{ij} \cdot b_{ij}, \text{ and } a_{ij} \oplus b_{ij}; \quad (19)$$

and this gives the coefficient polynomial, $$p_{ij} = a_{ij} \cdot b_{ij} x^j + (a_{ij} \oplus b_{ij}) x^{j-1} \quad (20)$$

For $m_i$=2, $j_{max}$=1, $$p_{iJ} = a_{iJ} \cdot b_{iJ} x^J + (a_{iJ} \oplus b_{iJ}) x^0. \quad (21)$$

Then, $$S = A + B = \sum_{i=0}^{n-1} \sum_{j=0}^{j=1} (a_{ij} + b_{ij}) x^{i+j}, \quad (22)$$

$$= \sum_{i=0}^{n-1} \sum_{j=0}^{j=1} \{a_{iJ} \cdot b_{iJ} x^1 + (a_{iJ} \oplus b_{iJ}) x^0\} x^i. \quad (23)$$

This is the simplified version of the CPA form for the summation of numbers A and B. To convert the result into ordinary binary form, it is important to notice that because the carry propagation is expressed in the polynomial, it will only add to the i+1 bit position, at j=0.

To convert from this form, it is again recognized that the logic terms a•b and a⊕b are never equal to logic "1" at the same time and that they are displaced by "2" to the first power in numerical value. This, of course, limits the carry propagation activity, since for addition each of the polynomials would never, for a given "i", have the binary value "11" to be added into the total. This simplifying logic-redundancy is used in determining the essential terms for the second stage of the adder, which leads to the design depicted in FIG. 2 (achieved with uniform two-input logic). Using the two-stage adder shown in FIG. 1 provides for the parallel execution of the coefficient polynomials until the second and final stage. This allows achievement of hardware parallelism through all CPA levels, and the merging with other operations and algorithms at the most desirable level to meet the efficiency requirements of a given application. This results in considerable economy in execution time in arithmetic operations.

The Multiplier:

For multiplication where accumulation is used to sum each bit-position, i=n-1 as shown above in Equations (22) and (23), h=k, and $m_i$ increases and then decreases according to the number of terms to be accumulated: from the most significant bit position to the least significant bit position, "i=o". All $m_i$ may be made equal if it is desired that the hardware realization be uniformly parallel over all bit positions. For a small number of terms n the advantages gained using variable $m_i$ for all i over the n bit positions is not significant. Using uniform hardware over the parallel paths does, however, have implementation and timing advantages. The sum of all $m_i$ yields the total length of the arithmetic result in coefficient polynomial form. The integrity of each parallel hardware path is maintained by the fact that no binary data is to be processed outside the identified paths of the operation, while the result is in coefficient polynomial form.

In cases involving the addition of a column of height h as an integral part of multiplication, h=n, and the degree, represented by an integer $m_i-1$, of each of the polynomial coefficients will vary depending on h; i. e., $Log_2 h$. For example, assume that coefficient polynomial representation is to be used to achieve the multiplication of two 8-bit numbers as a part of the arithmetic processing within an embedded system. Then, because there will be eight partial products to be added, $0 \leq m_{i1}-1 \leq Log_2 8; 0 \leq m_i-1 \leq 3$.

Figure 6:
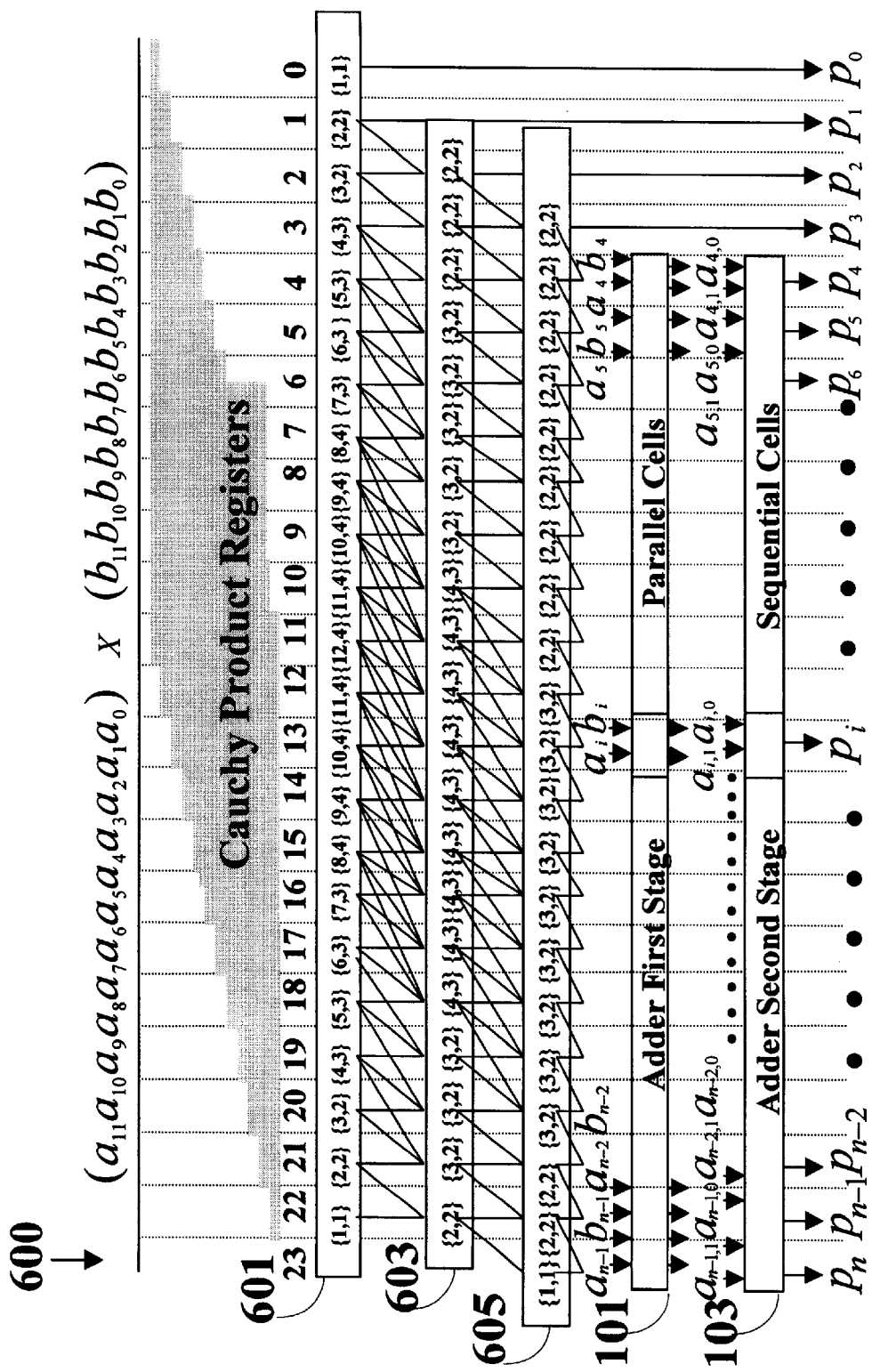
FIG. 6 illustrates multiple levels of counters, the number of levels depending on the word length.

Clearly, in this case $m_i$ is an integer that can vary from "1" to "4", depending on the phase of the multiplication being accumulated. As is shown below, and depicted in FIG. 3 where "C" followed by a bracketed pair of numbers indicates a counter, $m_i$ is the number of counter or accumulator outputs, or single-bit-position half adders being used to form a product in CPA form. The multiplier 300 illustrated in FIG. 3 utilizes Cauchy product registers 301, operating in accordance with well-known Cauchy product principle, where individual bit products resulting from Cauchy product operation are located. Cauchy product $C_n$ is defined as $$C_n = \sum_{k=0}^{n} a_k b_{n-k} \qquad (n = 0, 1, 2, \dots) \tag{24}$$

in which $\{a_n\}$ and $\{b_n\}$ are the two given input sets representing the a and b polynomial coefficients. The Cauchy products are organized into multiple columns in the Cauchy registers, each column-register representing different weights of the product polynomial. Multiple counter cells 303, coupled on one-to-one correspondence to the multiple column-registers of the Cauchy registers, perform binary summation of the bits in their respective corresponding columns and form the coefficient polynomials $p_i$ in CPA form. The number of levels of counters, as illustrated in FIG. 6 by a plurality of bracketed pairs of numbers in multiple layers 601, 603 and 605, depends on the word length, but is at least two. The various diagonal lines between the layers of counters in the figure signify cross-over bits.

Additional illustration is provided by the multiplication of two n-bit numbers using the coefficient polynomial representation;

$$A \times B = \sum_{i=0}^{2n-2} \left\{ \left( \sum_{j=0}^{m_i-1} a_{ij} x^j \right) \left( \sum_{k=0}^{m_i-1} b_{ik} x^k \right) \right\} x^i; \tag{25}$$

$$= \sum_{i=0}^{2n-2} \sum_{j=0}^{m_i-1} \sum_{k=0}^{m_i-1} a_{ij} b_{ik} x^{i+j+k}; \tag{26}$$

The multiplication above is expressed as a triple series and obeys the postulates and mathematical laws of a triple series. If the above is expanded into its algebraic form, the resulting product is in the Cauchy product form as used in ordinary algebra. The above form of the product of A and B expresses the summations of the bit-by-bit sub-products that are accumulated for the complete product, which may be accomplished concurrently for all binary digit positions, from the most-significant bit position to the least-significant bit position. For embedded systems, this permits earlier opportunity for follow-on action based on the magnitude of the product.

FIG. 5 shows a numerical example of the multiplication of two 12-bit numbers, with the counter cells and the coefficients shown for the coefficient polynomials. Each step of the multiplication process is illustrated therein and the initial-level counter path-width outputs $m_i$ are shown. The path-width of each column counter varies according to binary weights, from the least significant bit to the most significant bit: initially upward according to the number of bit-positions to be summed in the Cauchy product registers, or counted, and then downward.

It can be shown that the most hardware-efficient realization occurs when the multiplier and the multiplicand are each of length $2^r-1$, where r is an integer. FIG. 6, earlier referred to, includes an example of the multiplication of two 12-bit binary numbers $A_n$ and $B_n$. In this case, the number of bit-positions, the processing width, in the complete product would be twenty-four and the maximum number of bits to be summed or accumulated to form each bit-position is twelve, and the minimum is one. Path number "11" is labeled the critical path because it has the maximum number of 1-bits to be processed, or summed. It has three layers of parallel counter cells: {12,4}, {4,3}, and {2,2}. Once the columns have been merged to the level at which each may be represented by two bits, representing the set of coefficient polynomials with each having degree "1", then the first and second stages, comprising parallel cells 101 and sequential cells 103, respectively, of adder 100 complete the binary product to its final product form P. The sequential adding stage simply produces the set of coefficient polynomials that all have degree "0" so that a single bit exists at the final level in each of the bit-paths, representing the multiplication product in ordinary binary form. At this point, the degrees of the coefficient polynomials have expanded according to the computation stage of the multiplication and now are converted to ordinary binary form as the final result. At the output of each level of the column counters, the product is represented by a set of coefficient polynomials that express the specific carries to successive column locations toward the most significant bit position of the product. Therefore, the product progresses through the different counter levels concurrently and the outputs of each level are distributed only to those successive product bit-positions that would be affected by them. This means that the level-to-level carries are actually "cross-overs" and do not add any sequential nature to the levels of CPA processing. Furthermore, with this crossover process there is no additional execution cost because it is carried out with the CPA levels. The only sequential processes are the successive CPA levels and the very last stage, the adder second stage. The depth of each successive CPA level is $Log_2$ (previous column width.)

Above-described combined process progresses at the rate of the critical path and can be used asynchronously, beginning when the data are stored in the Cauchy product registers and continuing through all the necessary levels of parallel counters and through the two adder stages. Processing the would-be carries systematically through the three counter levels, as exemplified in FIG. 6, provides the product in reduced CPA form to the first adder stage in the execution time of the critical path. Merging coefficient polynomials in the various levels of the counters to achieve the degree of "1" for the resultant series of coefficient polynomial sets, each set representing the result of each level, is accomplished by the process of column value merging until the degree of "1" is reached. This is followed by the add operation to obtain the binary form of the result.

Figure 11:
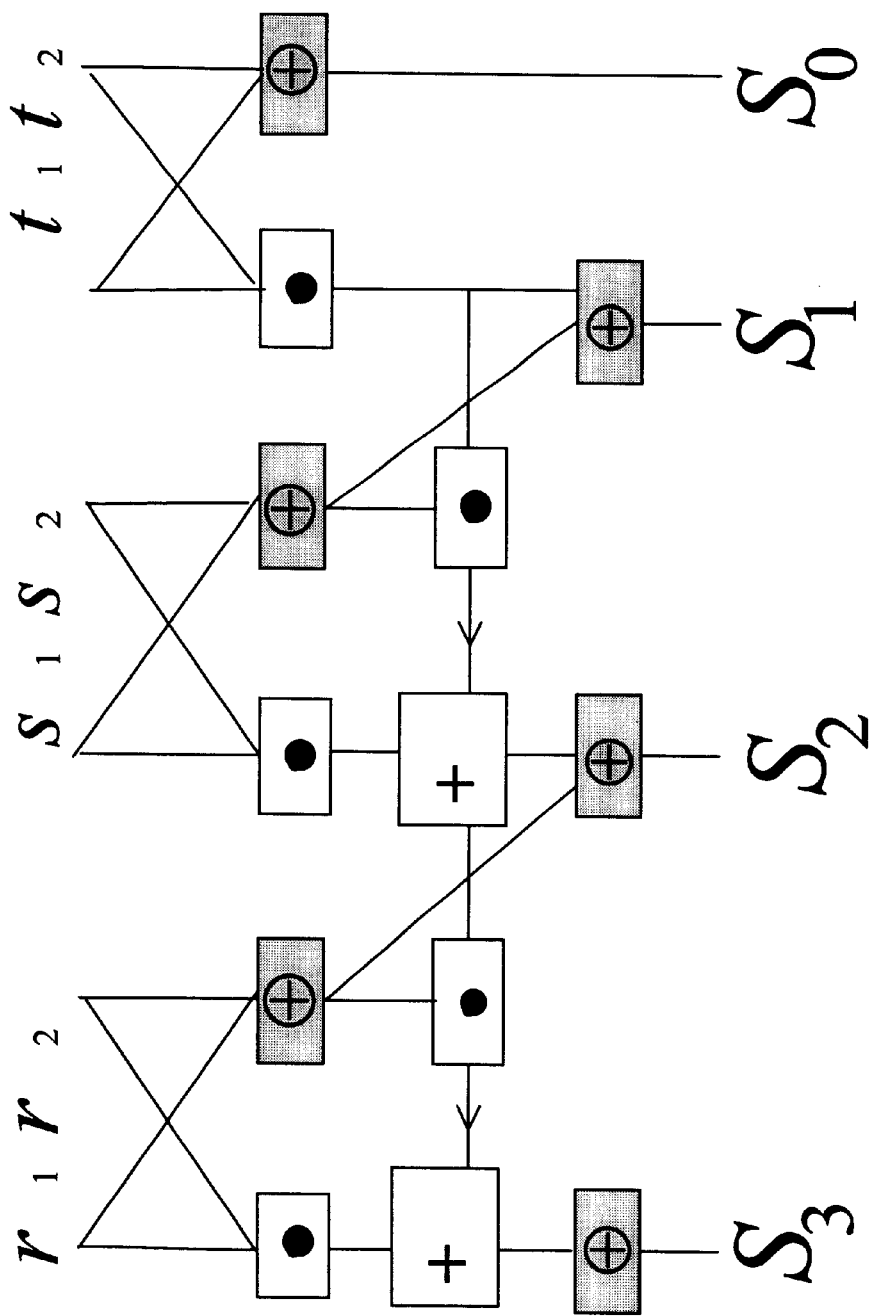
FIG. 11 shows the circuitry of an exemplar counter.

The multiply operation illustrated in FIG. 6 is more efficient than the realization of the same multiplier using single-input counters that accumulate the 1-bits of each column sequentially, because the parallel counter cells determine the set of coefficient polynomials representing the product in considerably less time. FIG. 4 illustrates how a column of 12 bits can be counted, i.e. the coefficient polynomial for the ith column of Cauchy product, 12 bits in height while FIG. 11 depicts the circuit of an exemplar counter cell. It comprises several of each of exclusive-or gate, AND gate and OR gate to produce the sum of interpreted counts. As in other figures, the diagonal lines indicate cross-overs which are counter level-to-counter level carries. In applications, it is convenient to have the flexibility to realize the counter cells in different ways. If entries are processed sequentially from the Cauchy product registers, as suggested above, less switch real estate is required than if entries are processed in parallel as in the case of the multiplier of FIG. 6. The difference occurs in the initial counter level since the next two levels are the same in both multipliers. The column heights in the Cauchy product registers determine the sizes of the individual counter cells, as stated above, and thereby determine the length of the set of coefficient polynomials representing the product at each of the counter cell levels. The word length of the summed columns is given by, $$WL = \sum_{i=0}^{i=2n-1} Log_2 h_i, \qquad (27)$$

where h for each of the columns is the next highest integer that is a power of "2". The set of coefficient polynomials $\{p_{n-1}p_{n-2} \cdots p_1 p_0\}$, representing the entire result at a CPA level is therefore of length given by WL.

Some useful parallel counter circuits are C{3,2}, C{4,3} and C{7,3}. These are also the most efficient relative to accomplished logic representation. Other counter couples can be represented by combinations of those listed. In all of these, it is desirable that processing take place with reduced logic depth and balanced counter assignments to yield faster column sums. The string of d's in FIG. 4 represents the bits for a 12-bit column to be summed. It is desirable that the summation be carried out asynchronously. To accommodate the arithmetic operations and/or algorithm integration it is interesting to note that combinations may be realized by simply summing all bits in corresponding columns of the operations and/or algorithms. Further, an entire column of the CPA may be summed independently as a block and then combined with corresponding columns of other products or values.

Figure 7:
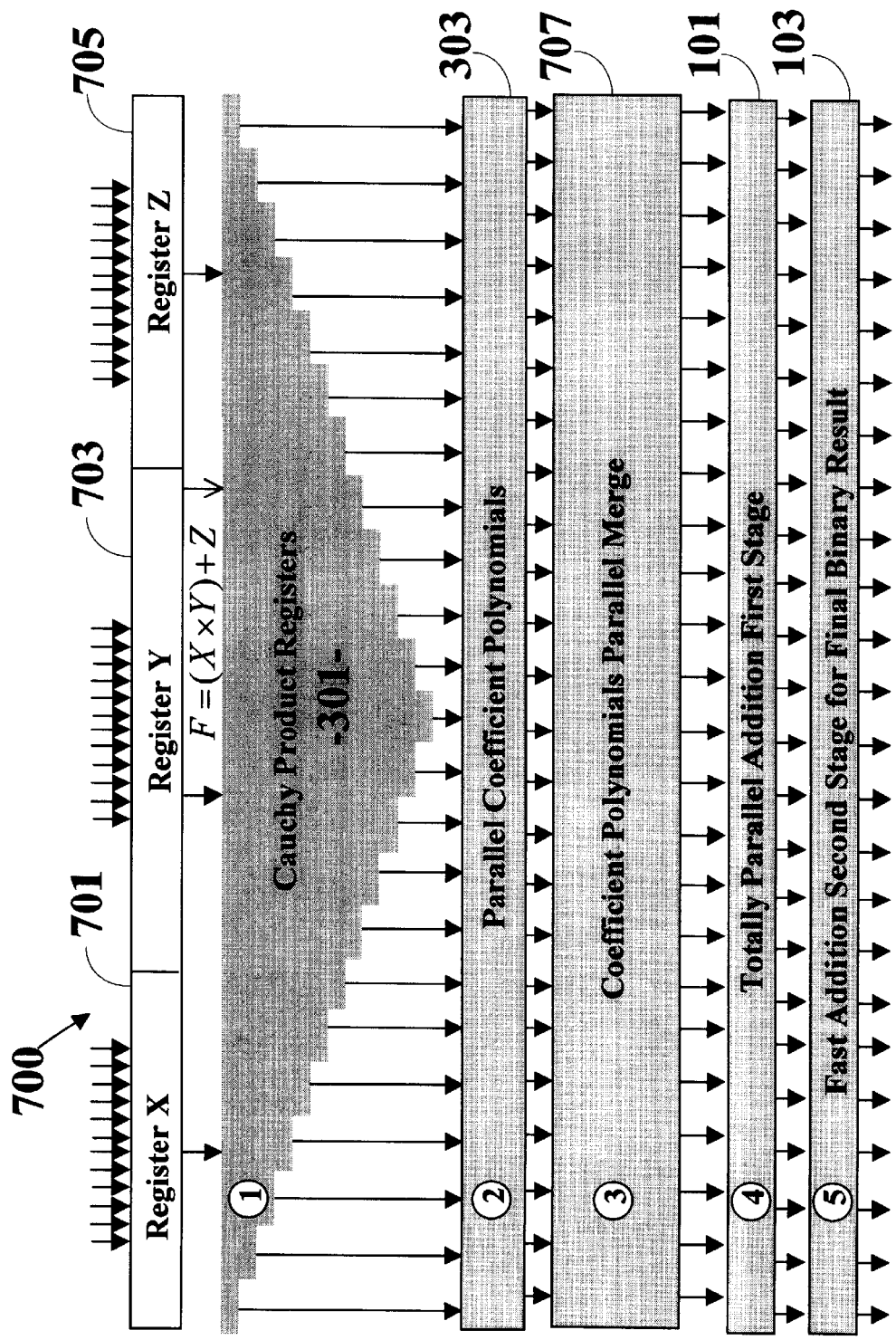
FIG. 7 is a preferred embodiment of the Asynchronous Parallel Arithmetic (APA) Processor Utilizing Coefficient Polynomial Arithmetic (CPA).

The above-described structures and functions of adder 100 and multiplier 300 are interconnected to form Asynchronous Parallel Arithmetic (APA) Processor 700 Utilizing Coefficient Polynomial Arithmetic (CPA), the preferred embodiment of which is depicted in FIG. 7 where encircled numerals indicate algorithmic steps executed by APA Processor 700. Because of the logic structure of the processor are developed component-by-component, it has attributes for use as a module for re-configurability at the data-path level.

The function, F=(X×Y)+Z, can be realized with a single-pass hardware structure with the values of X, Y and Z, such as registers 701, 703 and 705 each register holding therein an input number comprising a pre-selected number of binary bits and any algebraic signs that determine the arithmetic operation. The processing of algebraic signs and the control functions are omitted as the methods used to process them are generally known. Division is accomplished using the reciprocal of the divisor and both multiply and divide functions are then entered into Cauchy product registers 301 where the resulting Cauchy products are organized into multiple columns in the Cauchy registers, each column-register representing different weights of the product polynomial. The processor must have exit and entry pins at steps "2" and "3" for any processing including combining or merging of operations and algorithms to take place at the CPA initial level. Specifically, multiple counter cells 303, coupled on one-to-one correspondence to the multiple column-registers of the Cauchy registers, perform binary summation of the bits in their respective corresponding columns to form the coefficient polynomials $p_i$ in CPA form. The coefficient polynomials $p_i$ in all the ith columns of multiple Cauchy registers are merged or combined by multiple levels of counters 707 to the level at which each may be represented by two bits, representing the set of coefficient polynomials with each having degree "1". Processing the would-be carries systematically through the requisite number of counters (the number of levels of counters depending on the word length) provides the product in reduced CPA form to the first adder stage in the execution time of the critical path. Merging coefficient polynomials in the various levels of the counters to achieve the degree of "1" for the resultant coefficient polynomial sets, each set representing the result of each level, is accomplished by the process of column value merging until the degree of "1" is reached. At step "4" parallel addition occurs for summation of the addend and augend as entered, either to complete multiplication or to perform the add operation alone. If the final result is desired in ordinary binary form, then sequential addition is performed by sequential addition cells 103 at step "5".

Instructions for the above-described algorithmic functions of adder 100 and multiplier 300 may be embedded in a computer-readable medium and used to cause a computer system to utilize Coefficient Polynomial Arithmetic (CPA) to process given arithmetic operations on multiple sets of input binary numbers A and B, so as to achieve parallelism and concurrency at the data-path level.

Using parallel structures can provide essential efficiency for embedded, domain-specific algorithm-hardware processing. The CPA representation and its utility for direct formation of parallel hardware structures provides modular realizations of parallelism and concurrency that can execute arithmetic constructs with efficiencies to achieve real-time execution and interaction with other components. Use of the methodology based on coefficient polynomial arithmetic gives the ability to combine higher performance, the integration of related functionality and the introduction of intelligence. This would include data correction and registration from sensors or other sources prior to the execution process.

As a specific example, consider the integration of arithmetic operations representing different algorithms that are to be merged or integrated to determine a combined result. Added efficiency is achieved when the algorithms are integrated at the initial CPA level of the operations or results to be integrated or combined. Their two-column pairs are summed together at the initial counter-cell level, and the subsequent counter-cell levels process the combined result. Because the length of counter outputs are determined by $Log_2 n$, the combined counter output would be $Log_2 2n$. Since each column counter in a single CPA multiply operation sums n bits, the bit-length of each such counter's output is determined by the value of $Log_2 n$. When two such multiply operations are integrated at the initial CPA level, the bit-length of the output of each such integrated counter, summing 2n bits, is determined by the value of $$Log_2 2n = 1 + Log_2 n, \qquad (28)$$

yielding a combined-counter output length of $$1 + Log_2 n. \qquad (29)$$

Continuing this process through all levels of the counter cells requires less time and less switch real estate than if the two algorithms or operations are processed separately and then combined or integrated at the ordinary binary state. Needless to say, this is advantageous for embedded computing or realizing algorithms-to-architecture design. The two sets of coefficient polynomials may be combined in other ways also to achieve the integration or combination of operations or algorithms. An example is shown in FIG. 8 where imaging data can be corrected or registered according to specific algorithms that involve pixel by pixel correction or registration—either uniform or non-uniform. For the integration of algorithms or operations, the appropriate components may be summed or merged using the respective sets of coefficient polynomials representing the algorithm or operation to be combined. For example, consider the sets of coefficient polynomials, $$\{p_{n-1}p_{n-2}\ldots p_1p_0\}, \text{ and } \{q_{n-1}q_{n-2}\ldots q_1q_0\}, \tag{30}$$

where each $q_i$ maintains the same integrity of the bit positions as each $p_i$. The summation of the two sets then becomes, $$\{(p_{n-1}q_{n-1}),(p_{n-2}+q_{n-2})\ldots(p_1+q_1),(p_0+q_0)\}. \tag{31}$$

As a numerical example, consider the respective multiplication of two pairs of 15-bit numbers. Each respective critical path includes 15 bits in the column to be summed which means that a counter cell of C{15:4} is needed for each in parallel and then a counter cell for each of C{4:3} and then C{3:2} to provide the inputs to the final stage adder. The outputs from the adder represent the ordinary binary numbers to be summed in order to obtain the final combined result. If the two respective columns are combined at the initial level, a counter cell of C{30:5} is needed and then C{5:3} followed by a cell of C{3:2} to provide the inputs to the final stage adder. The output from the final stage adder is the final ordinary binary result. The latter merging or combining process at the initial level clearly shows the timing advantage of using CPA to combine the results at the initial level.

As an extended example, consider an application that involves the total summation of n products. The total sum desired can be formed at the initial level of the respective column sums representing the Cauchy product. This sum is useful in its coefficient polynomial form, or it can be merged to obtain the final result in ordinary binary form. Either way, the use of CPA to achieve the final result reduces the execution time. The greater the word length, the greater is the time saved in execution.

Conversion From CPA to Ordinary Binary Form

To provide for interfacing with other systems that use ordinary binary inputs and outputs, when necessary, the coefficient polynomial form must be converted into ordinary binary form which has the shorter width when compared to the CPA form. Because the coefficient polynomial form has all numerical information contained in the combined numbers from the arithmetic operations performed, it is several steps further along towards ordinary binary form. For this reason the final step of the conversion is simple and efficient and requires a minimum of integrated circuit real estate in the totally sequential form. In this final step, the carry propagation is made less complex by the overlapping polynomial degrees in the CPA form which includes partial addition from the arithmetic operation that was performed in CPA form using total parallelism and a single layer of exclusive-or gates.

For embedded, domain-specific systems, entry data sets would have coefficient polynomials of degree "0" because they would be expressed in ordinary binary form with single-bit coefficients. Subsequent coefficient polynomials are formed internal to the hardware and have higher degrees depending on the phase of the arithmetic computation. Overall results may be used in this format, or they may be converted to ordinary binary format. For example, with addition or multiplication the polynomial results contain all the information that the ordinary binary results would provide, but CPA results would be available much faster because of the highly parallel structures that could be used to obtain them. Converting to ordinary binary form requires efficient asynchronous accumulation that takes advantage of the highly parallel structures. It is shown below that the conversion from CPA form into ordinary binary form can be readily done in an operational execution time that is less than taken by conventional arithmetic methods.

A most revealing example of increased efficiency by use of CPA is given by image cross-correlation process illustrated in FIG. 9 to produce, from a freshly-created target image obtained by scanning and a pre-existing filter image, the correlation value that can aid in the recognition of an intended target. Arrays of pixels for both the target image and the filter image are input to Cauchy registers where a correlation value is computed by obtaining the sum of all the individual products of corresponding pixels from the target image and the filter image. With CPA, the cross-correlation value is obtained by the accumulation of each corresponding bit of the individual bit positions of each Cauchy product into a set of coefficient polynomials of the final cross-correlation value. This can be accomplished in three levels of CPA, each of which can be used to exercise predetermined decision algorithms based on the instant correlation value (i.e. the correlation value calculated at that particular level of CPA). It is not as advantageous to accomplish this at the final CPA level, the ordinary binary level. In other words, for a given product formed in the Cauchy product registers, each individual bit position may be summed or merged with the corresponding bit position of each and every other product to be summed to form the cross-correlation value. These results represented in CPA form can be summed to achieve the final CPA level for each column position and then these column positions are merged or summed using the resulting set of coefficient polynomials and appropriate levels of counter cells. This has a distinct advantage and an important one for image processing. Each pixel of each frame from the sensor may be absorbed and integrated by this process in the execution time for a single-bit-single-bit add. The final cross-correlation value, calculated thus, is applied or input to a suitable tracking means 901 to increase the level of accuracy and ease in recognizing and tracking a potential target.

Figure 10:
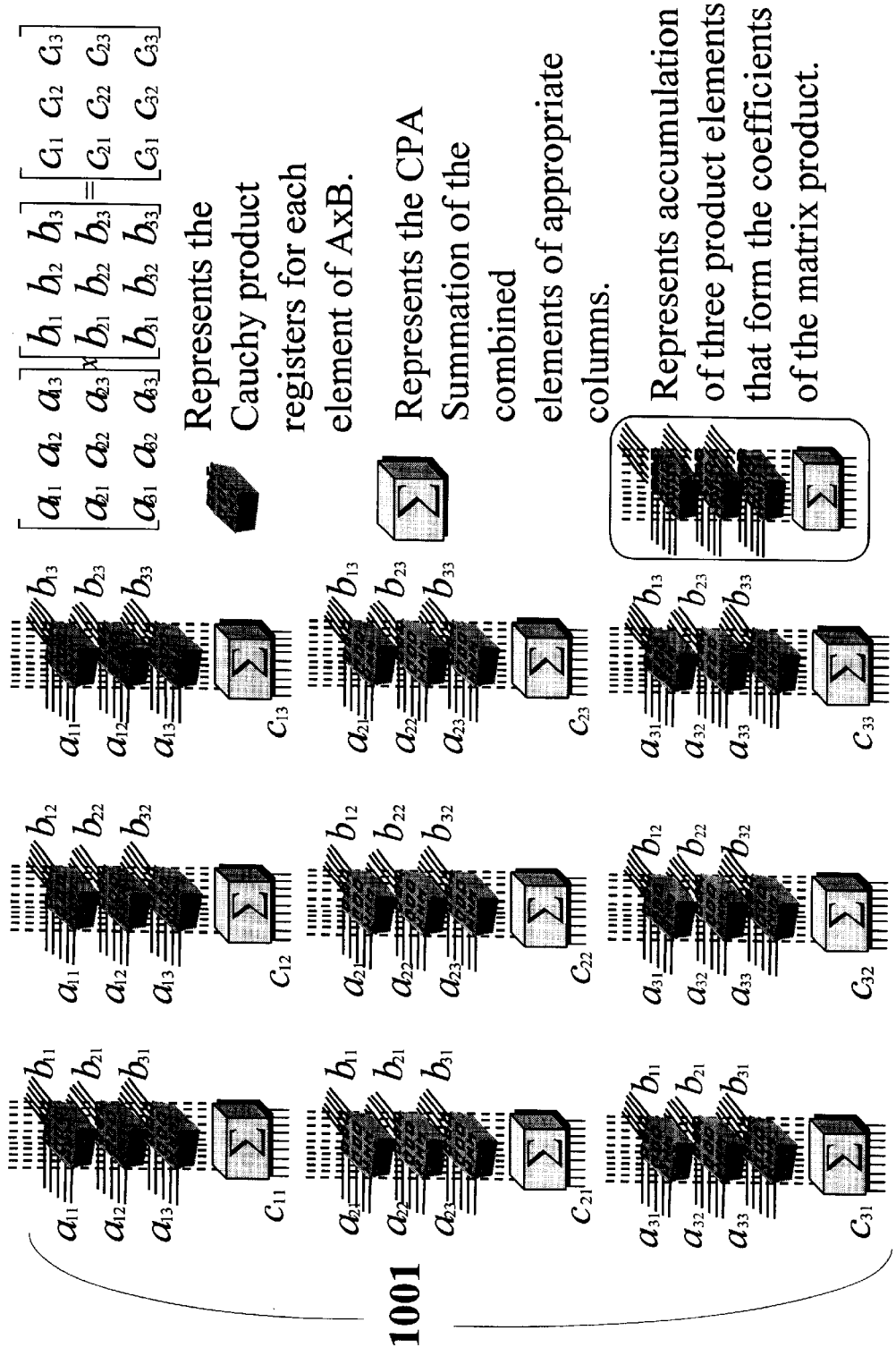
FIG. 10 illustrates fast matrix multiply using CPA.

The CPA process is also useful in achieving fast matrix multiply as shown in FIG. 10 with real or complex elements using multiple sets of registers 1001 for the respective coefficient polynomials representing the real and complex values at the CPA levels for the resulting matrix product. It provides parallel execution for the entire set of Cauchy product registers to achieve the individual column sums representing the respective bit positions of the final result matrix as a set of coefficient polynomials which can be summed or merged to obtain the final resultant matrix in ordinary binary form when needed. FIG. 10 also illustrates the capability to combine operations and algorithms either at the initial CPA levels of all columns of the product or at the single corresponding-bit level to accelerate the processing of products and arithmetic combinations of products.

To achieve desired results using CPA, it is not essential that the arithmetic operations be executed to their final binary form. A number can be represented by a set of single-bit-wide or multiple-bit-wide columns of height equal to a single bit, or greater. The object is, of course, to conduct parallel arithmetic operations by confining executions to single-column operations in the first step and then, when needed, merge the column operations or coefficients to form higher levels of algorithmic functionality and ultimately the final binary result desired.

When application algorithms are of like structure, their execution using highly parallel computer arithmetic generally promotes efficiency and reduces the complexity of the execution hardware required. This is the case when algorithms are implemented using CPA. Because there are usually several versions of each algorithm, the computation structures can relate or interact differently. Also, the algorithms within a given application suite are not generally mutually exclusive, either in structure, timing or in data structures. They are often mutually inclusive to some degree.

Although particular embodiments and forms of this invention have been illustrated, it is apparent that various modifications and other embodiments of the invention may be made by those skilled in the art without departing from the scope and spirit of the foregoing disclosure. Accordingly, the scope of the invention should be limited only by the claims appended hereto.

I claim:

1. Asynchronous Parallel Arithmetic (APA) processor utilizing Coefficient Polynomial Arithmetic (CPA) capable of processing given arithmetic operations on multiple sets of input binary numbers A and B, said APA processor comprising modular hardware components and being capable of achieving parallelism and concurrency at the data-path level, thereby facilitating the mapping of algorithms to hardware for embedded systems, said modular hardware components comprising: a means for holding therein the input binary numbers A and B; a parallel multiplier, coupled to said holding means, for processing said input binary numbers and producing therefrom a first set of coefficient polynomials $p_n$ in CPA form, said first set of coefficient polynomials being organized into a plurality of columns; a means for receiving and parallel-merging said first set of coefficient polynomials in said columns to produce a second set of coefficient polynomials and continuing said parallel-merging of the last set of coefficient polynomials until the degree of "1" for the resultant coefficient polynomial set is achieved; and a two-stage adder coupled to said parallel-merging means for rendering the result of said arithmetic operations on said input binary numbers A and B in ordinary binary form.

2. An APA processor utilizing CPA as set forth in claim 1, wherein said parallel multiplier comprises a plurality of Cauchy product registers coupled to said holding means, said Cauchy product registers receiving the input binary numbers from said holding means and, in response, producing therefrom Cauchy products polynomial, said products polynomial being organized into multiple columns in said Cauchy product registers, each column-register representing different weights of said products polynomial; and a first level of a plurality of identical counter cells, said counter cells being coupled on one-to-one correspondence to said multiple column-registers of said Cauchy registers, said first level of counter cells performing binary summation of the bits in their respective corresponding columns and yielding said first set of coefficient polynomials $p_i$ in CPA form.

3. An APA processor utilizing CPA as set forth in claim 2, wherein each of said counters comprises a plurality of each of XOR-gate, AND-gate and OR-gate, said gates being interconnected so as jointly to produce the sum of interpreted counts.

4. An APA processor utilizing CPA as set forth in claim 3, wherein said means for receiving and parallel-merging said first set of coefficient polynomials comprises at least a second level of counters, said second level of counters parallel-merging said first set of coefficient polynomials in said columns to produce a second set of coefficient polynomials.

5. An APA processor utilizing CPA as set forth in claim 4, wherein said receiving and parallel-merging means further comprises additional levels of counters, the number of levels being dependent on the word length of the binary input numbers, said additional levels of counters co-operating to merge said coefficient polynomials until a final resultant coefficient polynomial set is achieved, each coefficient polynomial set representing the result of corresponding level of counters and said final resultant coefficient polynomial set having the degree of "1".

6. An APA processor utilizing CPA as set forth in claim 5, wherein said two-stage adder comprises a parallel adder for receiving and performing initial parallel addition on said final resultant coefficient polynomial set in totally parallel CPA form to produce carry bits and sum bits; and a sequential adder, said sequential adder being connected to said parallel adder for receiving said carry bits and sum bits from said parallel adder and, in response, producing a final result in ordinary binary form.

7. An APA processor utilizing CPA as set forth in claim 6, wherein said parallel adder is comprised of a plurality of parallel cells and said sequential adder is comprised of a plurality of sequential cells, the number of said parallel cells equaling the number of bits in said final resultant coefficient polynomial set that are being added therein and the number of sequential cells being greater than the number of parallel cells by 1.

8. An APA processor utilizing CPA as set forth in claim 7, wherein said parallel and sequential cells are coupled to each other via conventional wire connection in one-to-one correspondence except for the very last one of said sequential cells.

9. An APA processor utilizing CPA as set forth in claim 8, wherein each of said sequential cells comprises an XOR-gate, an AND-gate and an OR-gate, said gates being interconnected with each other so as to enable each sequential cell to accept a sum bit and a carry bit from corresponding parallel cell and processing said bits to yield a final sum in ordinary binary form.

10. A computer-readable medium containing instructions therein for controlling a computer system and causing the computer system to utilize Coefficient Polynomial Arithmetic (CPA) to process given arithmetic operations on multiple sets of input binary numbers A and B, so as to achieve parallelism and concurrency at the data-path level, by:

(a) processing the input binary numbers and consequently producing a first set of coefficient polynomials $p_n$ in CPA form;
(b) organizing the first set of coefficient polynomials into a plurality of columns;
(c) parallel-merging the first set of coefficient polynomials in the columns to produce a second set of coefficient polynomials;
(d) continuing the parallel-merging of the last preceding set of coefficient polynomials until the degree of "1" is achieved for each resultant coefficient polynomial in the final set, said resultant coefficient polynomial set representing the final result in binary form.
(e) performing initial parallel addition on the final resultant coefficient polynomial set in totally parallel CPA form to produce carry bits and sum bits; and
(f) sequentially adding the carry bits and sum bits to render a final result in ordinary binary form.

11. A computer-readable medium containing instructions therein as set forth in claim 10, wherein said processing and producing step includes inputting a pair of binary numbers A and B into each of a plurality of Cauchy product register sets.

* * * * *